United States Patent [19]
Blecha

[11] Patent Number: 6,056,266
[45] Date of Patent: May 2, 2000

[54] DEVICE FOR CLOSING AN OPENING OF A TANK OR A TUBULAR CONDUIT

[75] Inventor: Thomas Blecha, Feldkirch, Austria

[73] Assignee: VAT Holding AG, Haag, Switzerland

[21] Appl. No.: 09/175,239

[22] Filed: Oct. 20, 1998

[30]  Foreign Application Priority Data

Oct. 20, 1997 [DE] Germany ............................ 197 46 241

[51] Int. Cl.[7] ................................................ F16K 25/00
[52] U.S. Cl. ............................ 251/158; 251/175; 251/193
[58] Field of Search ............................ 251/63.5, 63, 158, 251/175, 193

[56]  References Cited

U.S. PATENT DOCUMENTS

| | | | |
|---|---|---|---|
| 3,368,792 | 2/1968 | Schertler | 251/158 |
| 4,470,576 | 9/1984 | Schertler | 251/158 |
| 4,560,141 | 12/1985 | Bosch | 251/167 |

*Primary Examiner*—Kevin Shaver
*Assistant Examiner*—David A. Bonderer
*Attorney, Agent, or Firm*—Brown & Wood, LLP

[57] ABSTRACT

A device for closing an opening of a tank or a tubular conduit and including a plate for closing the opening and movable substantially perpendicular to a plane of the opening toward the opening to be pressed against a wall in which the opening is formed and away from the opening, and displaceable, in its position in which it is spaced from the opening, substantially parallel to the plane of the opening, first and second piston-cylinder units for displacing the closing plate parallel to the plane of the opening and perpendicular to the plane of the opening respectively, with each piston-cylinder unit having a housing with a cylinder bore and at least one piston displaceable in the cylinder bore relative to the housing, and conduits for communicating pressure medium to the cylinder bores of both piston-cylinder units for displacing respective pistons in respective bores.

15 Claims, 2 Drawing Sheets

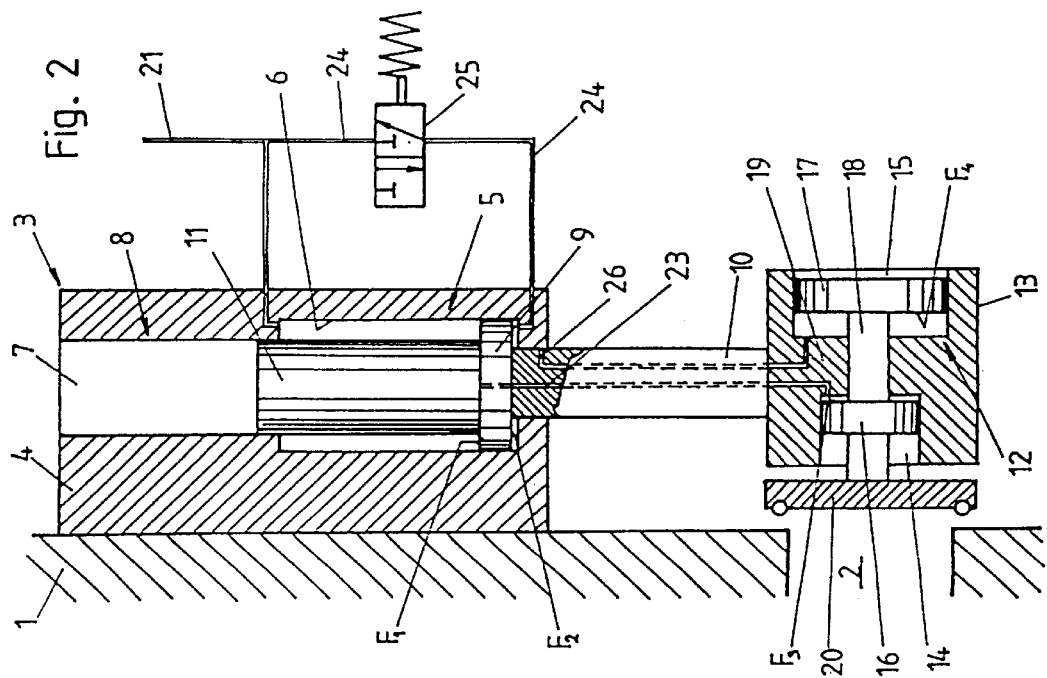
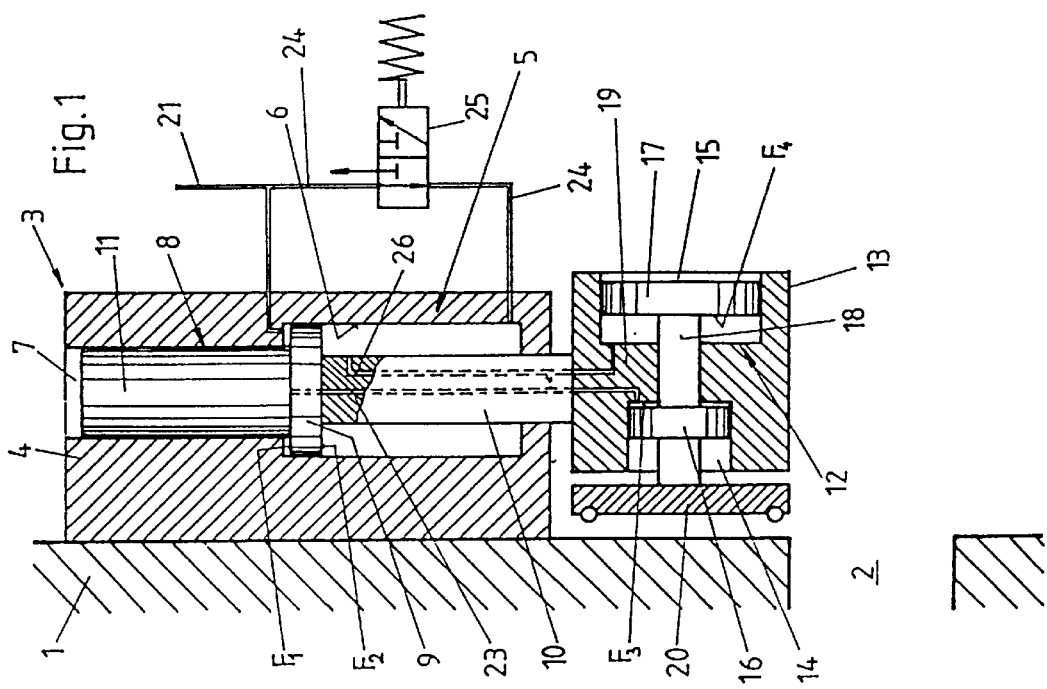

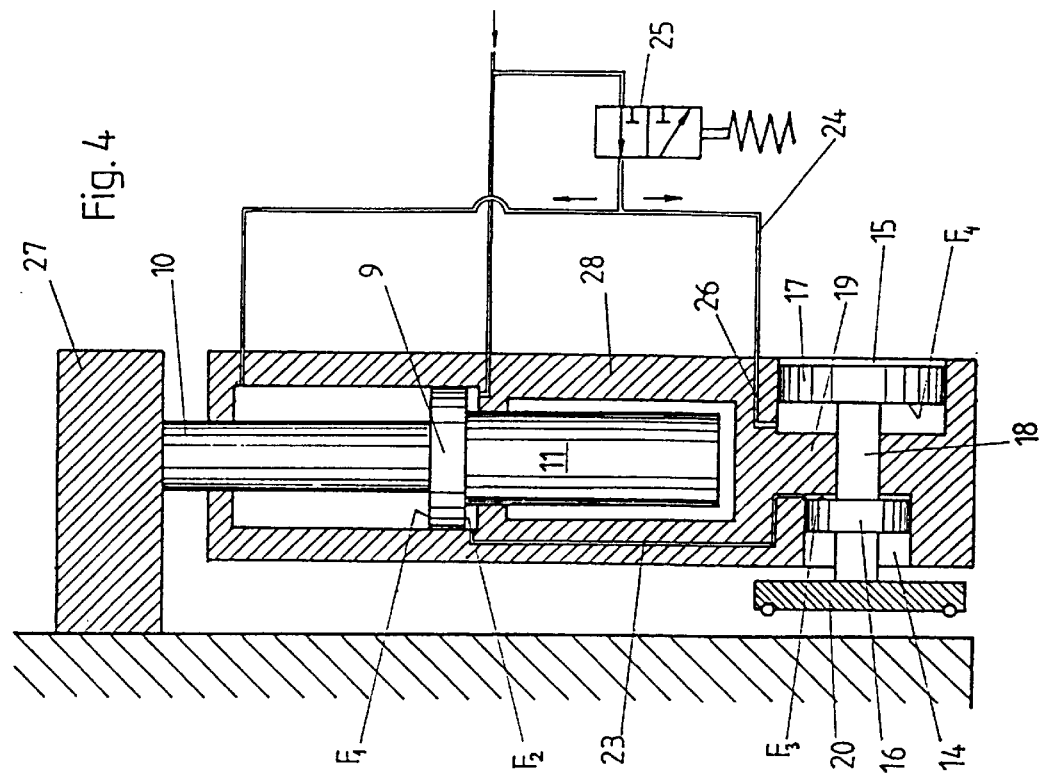
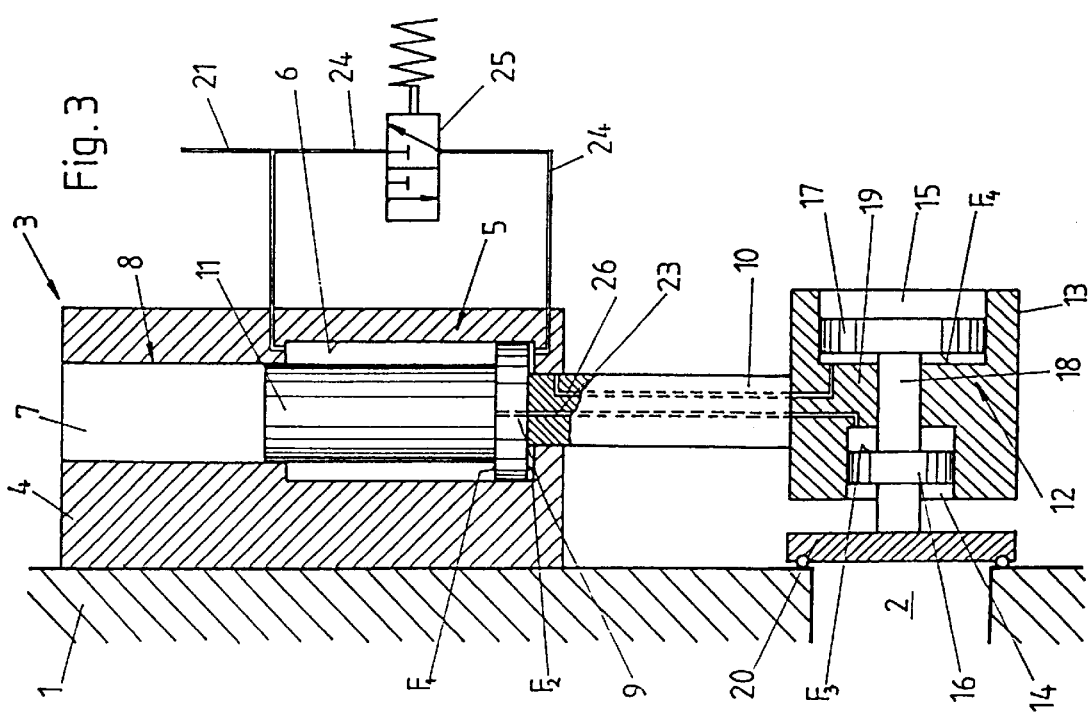

DEVICE FOR CLOSING AN OPENING OF A TANK OR A TUBULAR CONDUIT

BACKGROUND OF THE INVENTION

1. Field of the Invention

This present invention relates to a device for closing an opening of a tank or a tubular conduit and including a plate for closing the opening and movable substantially perpendicular to a plane of the opening toward the opening to be pressed against a wall in which the opening is formed, and away from the opening, the closing plate being also displaceable, in its position in which it is spaced from the opening, substantially parallel to the plane of the opening, and a piston-cylinder unit for displacing the closing plate parallel to the plane of the opening and having a housing with a cylinder bore and at least one piston displaceable in the bore relative to the housing.

2. Description of the Prior Art

Closing devices of the above-described type are well known. As a rule, they are called slide devices. The operation of such a device involves several different movements. The slide plates is moved essentially parallel to its plane to bring it into its open or closing position. In its open position, the closing plate is located sidewise with respect to the opening which it closes. In its closed position, the closing plate covers the opening. In order to sealingly close the opening, the closing plate is pressed against the sealing edge of the opening. The above-described closing devices are disclosed in U.S. Pat. Nos. 4,470,576; 3,368,792; 4,560,141; and German patent documents Nos. 3,209,217; 3,643,069; 2,528,043; 3,224,387; and 2,551,429. A common feature of conventional devices consists in that they all require expensive mechanical elements to move the plate from its closing position into its sealing position.

Accordingly, an object of the present invention is to provide a closing device of the above-described type actuation of which is substantially simplified in comparison with conventional devices.

SUMMARY OF THE INVENTION

This and other objects of the present invention, which will become apparent hereinafter, are achieved by providing in the closing device of the above-described type a second piston-cylinder unit for moving the closing plate toward and away from the opening perpendicular to the plane of the opening and having a cylinder bore and at least one piston displaceable therein and connected with the closing plate for moving the closing plate against the wall in which the opening is formed and away from the wall, and a conduit arrangement for communicating pressure medium to the cylinder bores of the first and second piston-cylinder units for displacing respective pistons in respective bores.

By providing the second piston-cylinder unit and the conduit means, it became possible to effect the displacement of the closing plate in its plane and movement of the plate toward the opening for sealingly closing the opening by using a simple pneumatic sequence control.

BRIEF DESCRIPTION OF THE DRAWINGS

The features and objects of the present invention will become more apparent, and the invention itself will be best understood form the following detailed description for the preferred embodiments when read with reference to the accompanying drawings, wherein:

FIG. 1 shows schematically a vertical longitudinal cross-section view of a first embodiment of a closing device for a tank or a tubular conduit in an open position thereof;

FIG. 2 shows schematically a vertical longitudinal cross-sectional view of a first embodiment of a closing device for a tank or a tubular conduit in a closed position thereof;

FIG. 3 shows schematically a vertical longitudinal cross-sectional view of a first embodiment of a closing device for a tank or a tubular conduit in a sealing position thereof;

FIG. 4 shows schematically a vertical longitudinal cross-sectional view of a second embodiment of a closing device for a tank or a tubular conduit in an open position thereof;

DETAILED DESCRIPTION OF THE PREFERRED EMBODIMENTS

FIG. 1 shows schematically a wall 1 of a tank (not shown in detail) an opening 2 of which can be sealingly closed with a closing device 3 according to the present invention. The closing device 3 has a housing 4 which is secured to the wall 1 with appropriate means, e.g., screws. The housing 4 includes a first piston-cylinder unit 5 with a two-step cylinder bore 8 the lower section 6 of which has a larger diameter than an upper section 7. The term "upper" and "lower" are used with respect to the positions of these sections in the shown drawings. A piston 9 is displaced in the larger diameter bore section 6. On opposite sides of the piston 9, there are provided two piston rods 10 and 11, respectively, having different diameters. The diameters of the piston rods 10, 11 are so selected that an upper surface F1 of the piston 9 is smaller than the lower surface F2, with the ratio of these surfaces F1:F2 being equal approximately 3:4 or 0.75. The piston-cylinder unit 5 has conventional sealings which are not shown for the sake of clarity. The sealings are provided on the piston 9 as well as in and on guide means for the piston rods 10, 11. The same applies to the second piston-cylinder unit 12 which will be described in detail below. The piston rod 11 remains in the housing 4 at each stroke of the piston 9 and in each position of the piston 9. The piston rod 10 projects downward from the housing 4 and carries, on its lower end, the piston-cylinder unit 12. The second piston cylinder unit 12 has a housing 13 with two cylindrical bores 14 and 15 having different diameters and in which pistons 16 and 17 are displaced, respectively. The two piston 16 and 17 are connected by a common piston rod 18 which extends through an intermediate wall 19 which separates the bores 14 and 15. On one end of the piston rod 18, which projects from the housing 13, there is arranged a closing plate 20 provided with a circumferential sealing. Both pistons 16 and 17 have different operating piston surfaces F3 and F4, respectively, the ratio F3:F4 of which is approximately equal 1:2 or 0.5.

Both piston-cylinder units 5 and 12 are subjected to the action of a pressure medium (pressure air) delivered through a pressure medium conduit 21. The pressure medium conduit 21 extends to the bore section 6 of the cylinder bore 8 and opens into it above the operational piston surface F1. The piston 9 and the piston rod 10 is pierced with a longitudinal bore 23 which extends through the housing 13 and opens into the cylinder bore 14 at operational surface F3. A conduit branch 24 is connected to the pressure medium conduit 21. The conduit branch 24 includes a spool valve 25 having two spool positions. The branch conduit 24 opens into the lower portion of the bore section 6 of the cylinder bore 8. The bore section 6 communicates with the cylinder bore 15 of the second piston-cylinder unit 12 via a second bore 26 formed in the piston rod 10. In the cylinder bore 15, the second bore 26 opens at the side of the piston surface F4. Both positions of the spool of the valve 25 can be seen in FIG. 1. In the position shown in FIG. 1, an open position of the closing device, the pressure medium, which flows through the branch conduit 24, acts on the surface F2 of the piston 9 and the surface F4 of the piston 17. The pressure in all conduit branches and in all bores remains the same, and the elements of the closing device occupy a position shown in the drawing.

As shown in FIG. 1, the pistons 9, 16 and 17 are subjected to the same pressure. Due to the above discussed ratios of the piston surfaces F1 and F2 and F3 and F4, the pistons 9, 16 and 17 are held in the positions shown in FIG. 1.

When the position of the spool valve changes, the branch conduit 24 is vented into atmosphere while the pressure is maintained in conduit 21. The pressure acting on the surface F2 is reduced until forces acting on the surfaces F1 and F2 becomes equal. As a result, the piston 9 moves downward due to action on the surface F1 of a pressure which is greater than that applied to the surface F2, and the closing device occupy a position shown in FIG. 2, with the piston 16 and 17 of the piston-cylinder unit 12 occupying the same position as in FIG. 1. Upon movement of the piston 9 downward, the volume beneath it is reduced. The pressure difference in the bores 14 and 15 of the piston-cylinder unit 12, which results from the movement of the piston 9 downward, retains the closing plate 20 in the same position as in FIG. 1. When the piston 9 reaches its lower end position, as shown in FIG. 2, the pressure in the bore 15, which acts on the surface F4, is reduced as a result of venting the branch conduit 24, and the piston 16, which is subjected to the pressure in conduct 21, moves leftward, displacing the closing plate 20 into a position shown in FIG. 3 in which the opening 2 is sealed. When the opening 2 becomes sealed, the branch conduit 24 is vented.

When the opening 2 needs be opened, the spool valve 24 is brought into the position shown in FIG. 1. The pressure medium (air), which flows through the branch conduit 24, due to the above-described piston surface ratios, moves the piston 17, together with the closing plate 20 rightwardly, and the piston 9 upwardly, into the initial position shown in FIG. 1.

The above-described construction is so designed that the surfaces F2 and F4 of the pistons 9 and 17, respectively, which are alternatively subjected to pressures applied by the pressure medium, and the constant reaction forces acting thereon are so selected that upon the pistons being alternatively subjected to the action of the pressure medium, the displacement of the closing plate 20 parallel to its plane or to the plane of the opening 2, on one hand, and the displacement or lifting of the closing plate 20 perpendicular to its plane or the plane of the opening 2, on the other hand, follow each other in a timely manner. Thereby, a desired pneumatic sequence control is achieved with very small expenses and with a simple two position spool valve.

In the embodiment shown in FIGS. 1–3, the pressurized surfaces F1 and F3 of the pistons 9 and 16, respectively, are subjected to a constant air pressure. Basically, it is possible to apply pressure to these surfaces with springs, e.g., helical springs, which can be so formed that they would have a spring constant as even as possible in their operational range.

As it has already been mentioned above, in the embodiment shown in FIGS. 1–3, the housing 4 is secured to the wall 1 of the tank.

FIG. 4 shows an embodiment of a closing device according to the present invention in which the piston rod 10 of the piston 9 has one of its end secured to a bracket 27 projecting from the wall 1. In this embodiment, only one housing 28 is provided in which both piston-cylinder units 5 and 12 are arranged, with the axes of the two cylinder bores extending perpendicular to each other. Otherwise, the arrangement of the operational circuit of the closing device is substantially the same as in the embodiment shown in FIGS. 1–3, and its operation is similar to that of the device shown in FIGS. 1–3. The elements of the device shown in FIG. 4 are designated with the same reference numerals as corresponding elements of the device shown in FIGS. 1–3.

In both embodiments, the closing device is shown schematically. An actual embodiment can include more piston-cylinder units, connected parallel with each other, dependent on the size of the closing plate.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A device for closing an opening of one of a tank and a tubular conduit, the device comprising:

a plate for closing the opening and movable substantially perpendicular to a plane of the opening toward the opening to be pressed against a wall in which the opening is formed, and away from the opening; the closing plate being displaceable, in a position thereof in which it is spaced from the opening, substantially parallel to the plane of the opening;

a first piston-cylinder unit for displacing the closing plate parallel to the plane of the opening and having a housing with a cylinder bore and at least one piston displaceable in the cylinder bore relative to the housing;

a second piston-cylinder unit for moving the closing plate toward and away from the opening perpendicular to the plane of the opening and having a cylinder bore and at least one piston displaceable therein and connected with the closing plate for moving the closing plate against the wall in which the opening is formed and away from the wall; and conduit means for communicating pressure medium to the cylinder bores of the first and second piston-cylinder units for displacing respective pistons in the respective cylinder bores.

2. A closing device as set forth in claim 1, further comprising means for applying a substantially constant pressure force to one side of the piston of the first piston-cylinder unit and of the piston of the second piston-cylinder unit.

3. A closing device as set forth in claim 1, wherein a respective one of opposite sides of the piston of the first piston-cylinder unit and a respective one of opposite sides of the piston of the second piston-cylinder unit are subjected to action of a pressure medium having a constant pressure.

4. A closing device set forth in claim 3, wherein another one of the opposite sides of the piston of the first piston-cylinder unit and another one of the opposite sides of the piston of the, second piston-cylinder unit are subjected to action of a variable pressure medium.

5. A closing device as set forth in claim 4, wherein the opposite sides of the piston of the first piston-cylinder unit have different sizes.

6. A closing device as set forth in claim 5, wherein the respective one side of the piston of the first piston-cylinder unit has a smaller size than an opposite side thereof, and the respective one side of the piston of the second piston-cylinder unit has a smaller size than an opposite side thereof.

7. A closing device as set forth in claim 1, wherein the piston of the first piston-cylinder unit is provided on opposite sides thereof with piston rods having different diameters such that a ratio of the opposite sides of the piston is equal to about 0.75.

8. A closing device as set forth in claim 1, wherein the second piston-cylinder unit has two cylinder bores and two pistons having different diameters and displaceable in respective bores, the two pistons being connected by a piston rod extending through an intermediate wall separating the two bores.

9. A closing device as set forth in claim 8, wherein a ratio of the diameters of the two piston is equal to about 0.5.

10. A closing device as set forth in claim 7, wherein the second piston-cylinder unit has two cylinder bores separated by an intermediate wall and two pistons displaceable in respective bores and connected by a piston rod extending through the intermediate wall, the two pistons having different diameters a ratio of which is equal to about 0.5.

11. A closing device as set forth in claim 1, wherein the piston of the first piston-cylinder unit is provided on opposite sides thereof with piston rods having different diameters, wherein the second piston-cylinder unit has two cylinder bores separated by an intermediate wall and two pistons displaceable in the two bores, respectively, and connected with a piston rod extending through the intermediate wall, the two pistons having different diameters a proportional number of which is smaller than a proportional number of the opposite sides of the piston of the first piston-cylinder unit.

12. A closing device as set forth in claim 10, wherein two longitudinal bores are provided in one of the piston rods provided on the opposite sides of the piston of the first piston-cylinder unit for communicating the bore of the first piston-cylinder unit with the two bores of the second piston-cylinder unit.

13. A closing device as set forth in claim 1, wherein the first and second piston-cylinder units are located in a common housing, wherein the axes of the bores of the first and second piston-cylinder units extend perpendicular to each other, and wherein one of two piston rods provided on opposite sides of the piston of the first piston-cylinder unit is fixedly secured.

14. A closing device as set forth in claim 5, wherein the sizes of the opposite sides of the pistons of the first and second piston-cylinder units and pressures applied thereto are so dimensioned that displacement of the closing plate parallel to the plane of the opening and movement of the closing plate perpendicular to the plane of the opening toward and away from the opening is effected one after another in a timely manner.

15. A closing device as set forth in claim 14, wherein the conduit means comprises a two-position spool valve for alternatively subjecting the pistons of the first and second piston-cylinder units to action of the variable pressure medium to displace the closing plate parallel to the plane of the opening and movement of the closing plate perpendicular to the plane of the opening toward and away from the opening is effected one after another in a timely manner.

* * * * *